Figure 5:
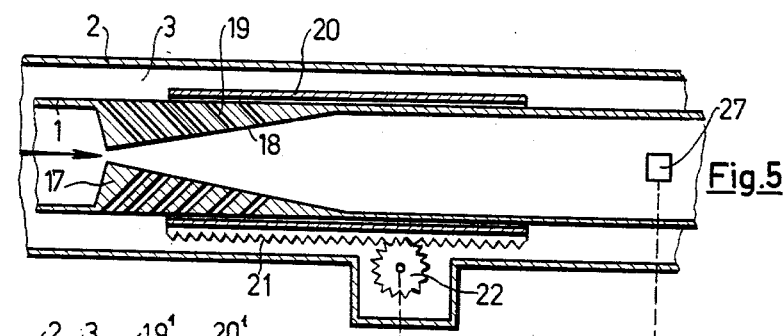

Nov. 23, 1965 H. GOOS ETAL 3,219,483
APPARATUS FOR CONTINUOUS GELATINIZATION OF STARCH
Filed July 27, 1962 2 Sheets-Sheet 1
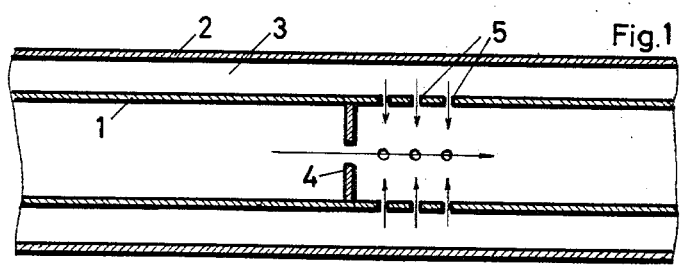
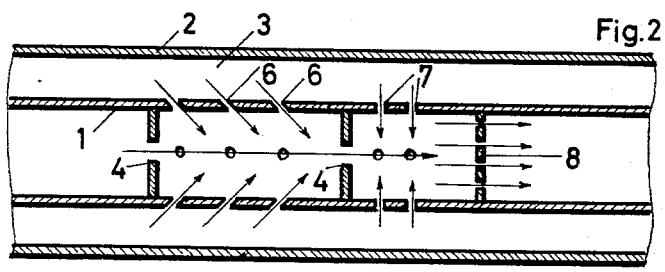
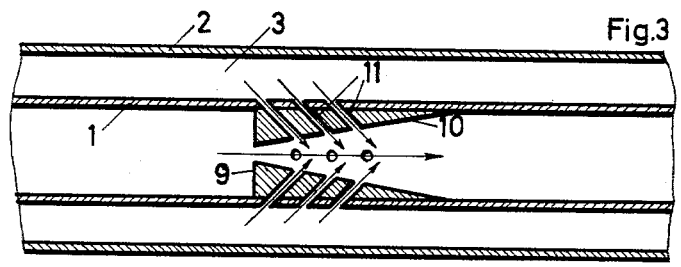
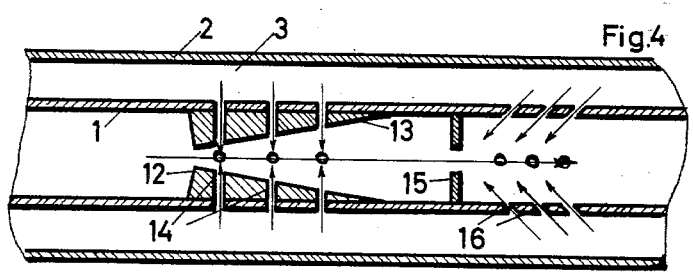
INVENTORS.
HANNO GOOS
HANS WOLFGANG MAURER
ANTON W. KURZ Nov. 23, 1965    H. GOOS ETAL    3,219,483
APPARATUS FOR CONTINUOUS GELATINIZATION OF STARCH
Filed July 27, 1962    2 Sheets-Sheet 2

INVENTORS.
HANNO GOOS
HANS WOLFGANG MAURER
ANTON W. KURZ
BY *Dodge and Sons*
ATTORNEYS

United States Patent Office 3,219,483
Patented Nov. 23, 1965

3,219,483
APPARATUS FOR CONTINUOUS GELATINIZA-
TION OF STARCH
Hanno Goos, Hans Wolfgang Maurer, and Anton W.
Kurz, Ravensburg, Germany, assignors to Escher Wyss
G.m.b.H., Ravensburg, Wurttemberg, Germany, a corporation of Germany
Filed July 27, 1962, Ser. No. 212,898
Claims priority, application Germany, Aug. 19, 1961,
E 21,558
19 Claims. (Cl. 127—28)

Starch is an important basic material and auxiliary material for numerous branches of industry. It is used in the papermaking industry for sizing the paper in the pulp and on the surface, as well as binder for coating mixtures, it is used in the textile industry for sizing and dressing, it is employed in numerous branches of the foodstuffs industry as thickener, it is employed in the fermentation industry and brewing for fermentation processes, it is used for the manufacture of dextrin, starch syrup and glucose as well as for many other purposes. A prerequisite for the use of starch in the above-mentioned processes is complete gelatinization. By the action of a temperature situated in general at 65° to 70° C. and determined by the nature of the starch, the gelatinizing temperature, the starch grains are caused to swell and are finally destroyed. The amylopectin and amylose molecules, which build up the starch grain, can hydrate and form a thick paste. The higher the concentration of this starch paste, the higher is also the viscosity of this paste, unless the amylopectin and/or amylose molecules have been exposed to a mechanical, chemical or enzymatic breakdown before or during gelatinization.

Thermal gelatinization of starch may also be replaced entirely or partly by alkaline gelatinization. For this purpose, an ungelatinized or partly gelatinized starch suspension is mixed with an alkaline solution of chemicals, preferably alkali lyes.

Starch paste can be made in known manner in tanks by the batch process. Either a starch suspension is raised to the gelatinizing temperature by direct or indirect heating, or a starch suspension is poured into hot or heated water with stirring, or starch is springled into hot or heated water with stirring. Disadvantages of these processes are that large tank installations are required for making the pastes, these installations require scrupulous attention, starch gelatinization in the batch process can only be inadequately adapted to sudden disturbances and changes in operation, the necessary uniformity of the pastes cannot be adequately ensured in every batch, the starch pastes produced in a large quantity in each batch have to be kept during consumption for a long time at elevated temperatures, often in a temperature range which is advantageous for enzyme action, whereby a reduction in yield and quality may ensue and many other disadvantages. In the manufacture of starch paste by the batch process, the workable starch concentration is limited to from 0 to 12%, unless pretreated, decomposed starches of relatively low specific viscosity are used. Attempts have often been made to obviate the difficulties in batch production of pastes by ordering for the required purposes a starch gelatinized and dried on hot rolls or by means of some other process and using this so-called swelling starch. Transport of undried starch pastes between different works is accompanied by considerable risk, since as already mentioned starch pastes are exceptionally prone to enzymatic breakdown reactions. The transport of the amount of water contained in the starch pastes over considerable distances is in any event to be regarded as uneconomical. It is obvious that the use of swelling starch is much more expensive than the use of a freshly prepared starch paste, since drying of the swelling starch is an essential additional part of the process. For the many, already enumerated applications of starch, therefore, a method for the rational, continuous gelatinization of starch directly before use is of exceptional interest.

The invention now relates to an apparatus for the continuous gelatinization of starch, partly decomposed starch or starch derivatives by means of a gelatinizing reagent, like steam or a chemical solution. This apparatus, according to the invention, comprises a tube having one or more cross-section constrictions through which is passed a suspension of the substances to be gelatinized, and in the wall of which, after the cross-section constriction, in the transitional region to the full cross-section one or more inlet orifices are provided for the said gelatinizing reagent.

It has been found that with such an extremely simple and reliable apparatus, it is possible to produce completely homogeneous starch pastes from untreated native starch in the concentration range 0 to 16% if heating steam is introduced directly into the suspension through the aforesaid inlet orifices in the tube wall. The same apparatus may also be used, however, if instead of heating steam, a chemical solution producing gelatinization is introduced through the said orifices.

The cross-section constriction in the tube may be for example a diaphragm with one or more passages or a nozzle. Furthermore, the cross-section constriction may be followed by a steady widening of the tube cross-section. Two or more cross-section constrictions may also be provided one after the other in the direction of flow.

In this apparatus, the starch suspension and starch paste move continuously through the reaction zone along a pressure gradient. On passing through the cross-section constriction, and on the mixing of the starch milk with the steam or chemical solution, the compressive and shearing forces exerted on the starch paste forming are such that paste formation is advantageously assisted.

The apparatus may also be used for the processing of starches which have been pretreated chemically, enzymatically or mechanically for increasing or reducing the viscosity of the pastes and hence for increasing or reducing the workable starch concentration. Furthermore, the apparatus may be used for the continuous gelatinization of starch derivatives, such as starch ethers, starch phosphates, oxidation products of starch, starches partly decomposed by acids or enzymes or the like.

Since generally starch gelatinization has to be carried out in a temperature range from 50° to 100° C., while the starch pastes are used in a different temperature range, which in most cases is lower, it is expedient that the continuously produced starch pastes if necessary be also cooled continuously.

For this purpose, the apparatus according to the invention can be extended by the provision, after the inlet orifice or orifices for the steam or the gelatinizing chemical solution, of at least a further cross-section constriction, followed by orifices in the tube wall for the supply of cooling and diluting liquid. Through these last-mentioned orifices, it is also possible to introduce if desired a liquid for preserving the paste.

In a preferred embodiment of the apparatus there is furthermore provided, in the direction of flow of the suspension or paste, after the inlet orifice or orifices for the steam or chemical solution, a screen for temporary subdivision of the substance into a plurality of partial streams. This step assists the formation of a homogeneous paste and also serves to suppress or limit the build-up of structure viscosity in the starch paste on its passage through the apparatus described.

It may also be desirable for the paste formed to remain for some time in the apparatus. For this purpose, the apparatus according to the invention may be extended by providing, after the inlet orifice or orifices for the steam or for the gelatinizing chemical solution or for the supply of cooling, diluting or preserving liquid, at least one further cross-section constriction followed by orifices in the tube wall for the return of the already produced starch paste to a point situated upstream, for example, to a point in the apparatus situated immediately after the commencement of paste formation.

FIGURES 1 to 8 of the drawing show different constructional examples of the subject of the invention.

The starch suspension to be gelatinized is passed through a tube 1 in the direction of the arrow. This tube is surrounded by a jacket 2, which with the tube 1 confines a space 3 for gelatinizing reagent, e.g. steam.

According to FIGURE 1, a diaphragm 4 is inserted in the tube 1 as cross-section constriction. Following this diaphragm, that is to say, in the transition region, in which the flowing medium is again distributed over the full cross-section of the tube, peripherally and longitudinally distributed holes 5 are provided in the tube wall 1 and serve as inlet orifices for the steam necessary for gelatinization.

According to FIGURE 2, two cross-section constrictions 4 in the form of diaphragms follow one another in the direction of flow. Following the first constriction are inlet orifices for the steam, these orifices being in the form of passages 6 inclined to the tube axis in the direction of flow of the suspension. After the second constriction follow holes 7 as steam inlet orifices in the tube wall as in the case of FIGURE 1, and after these holes is a screen 8 which subdivides the substance temporarily into a number of partial streams.

In the embodiment according to FIGURE 3, a diaphragm-like constriction 9 is followed by a gradual widening 10 of the tube cross-section. The steam inlet orifices are provided in the region of this widening 10 as passages 11 inclined to the tube axis in the direction of flow of the suspension.

In contrast to the embodiment according to FIGURES 1 to 3, which have sudden cross-section constrictions, the embodiment according to FIGURE 4 has a slightly conical cross-section constriction 12, which may preferably also be of nozzle-like construction, followed by a gradual widening 13. In this case, the steam inlet orifices are in the form of passages 14 perpendicular to the tube axis. The widening 13 is followed by a second cross-section constriction in the form of a diaphragm 15, and the steam inlet orifices following this diaphragm are in the form of passages 16 inclined to the tube axis opposite to the direction of flow of the substance.

Instead of individual holes or passages 5, 6, 7, 11, 14, 16 an annular gap or a series of annular gaps could possibly be provided.

In the use of the embodiments described in FIGS. 1 to 4, clear functional relationships exist between the quantity and temperature of the starch suspension to be gelatinized, the starch content thereof and the nature of the starch, the quantity, the temperature and the initial pressure of the gelatinizing reagent (heating steam or chemical solution), the free cross-sectional area for the passage of the starch suspension and of the gelatinizing reagent and also the velocities thereof. With constant free cross-sectional areas for the conveying and mixing of starch suspension and gelatinizing reagent, the gelatinizable starch concentration is primarily determined by the admission pressure of the gelatinizing reagent. With constant input pressure of the gelatinizing reagent and a fixed free cross-sectional area for the passage thereof through the orifices in the tube wall, specific properties of the product (gelatinization temperature, condition of swelling and disintegration of the starch) are only obtained with a specific, constant throughflow quantity of the product. However, if it should happen that, after a lowering of the production capacity, the flow velocity of the starch suspension through the constriction in cross-section and the subsequent tube section of the gelatinizing apparatus falls below a predetermined ratio with respect to the input velocity of the gelatinizing reagent with a constant input pressure, the components are not uniformly mixed. If the flow velocity of the starch suspension increases after a rise in the processing capacity, a correspondingly larger amount of gelatinizing reagent is to be introduced in order to maintain the desired properties of the starch product. With constant input pressure of the gelatinizing reagent, the free throughflow area must be modified in order to ensure the necessary transfer of substance or heat.

The embodiments according to FIGS. 5 to 8 provide the possibility of adapting the apparatus to different working conditions by providing means which permit of varying the relative quantities, pressures and velocities of the suspension of the substance to be gelatinized and of the gelatinizing reagent.

In all these constructional forms, the starch suspension to be gelatinized is conducted in the direction of the arrow through the tube 1. The said tube is enclosed by a jacket 2 which, in conjunction with the tube 1, defines the space 3 for the gelatinizing reagent which is to be supplied, more especially steam or a solution of chemicals. The tube 1 has a conical constriction 17 in cross-section and a subsequent steady enlargement 18 for the cross-section, having inlet orifices 19 for the gelatinizing reagent.

According to FIG. 5, for varying the free cross-sectional area of the inlet orifices 19, a closed sleeve 20 serving as a covering member is arranged co-axially of the tube 1, the position of said tube being adapted to be changed in relation to the orifices 19. With axial displacement of the sleeve 20, the number of the free orifices 19 for the gelatinizing reagent is modified. In order to render such a displacement possible, the sleeve 20 is provided on its underside with a rack 21, with which meshes a gearwheel 22 adapted to be actuated from outside by means (not shown).

Figure 6:
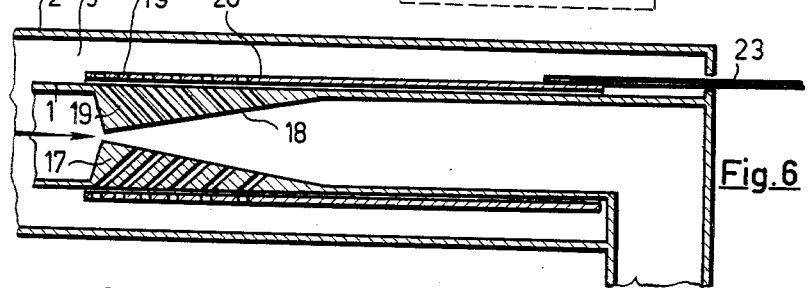

According to FIG. 6, a sleeve $20^1$ is provided as cover member, said sleeve comprising orifices $19^1$ corresponding to the inlet orifices 19 for the gelatinizing reagent. With displacement or rotation of the sleeve $20^1$, the free cross-sectional area of the individual inlet orifices 19, $19^1$ is altered without the number of the free flow orifices being reduced or increased. The sleeve $20^1$ can be externally actuated by a rod 23.

Figure 7:
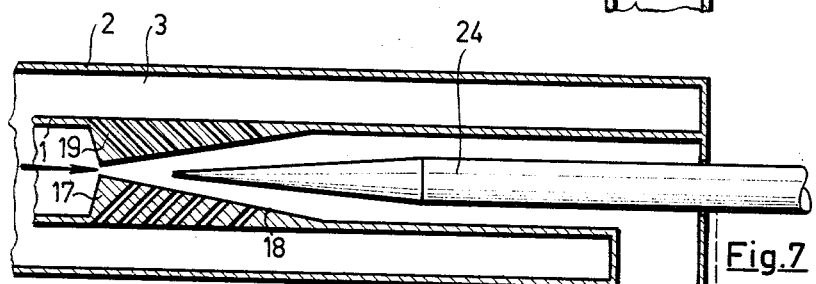

With the arrangement according to FIG. 7, a displacement rod 24 is provided co-axially of the tube for the purpose of altering the free cross-sectional area for the suspension in the transition region 18 following the constriction 17 in the cross-section of the tube 1, said rod being of a form so that it tapers towards the narrowest cross-section of the tube 1. The rod 24 can be moved axially from outside, its pointed end finally extending into the smallest cross-section of the tube 1.

Figure 8:
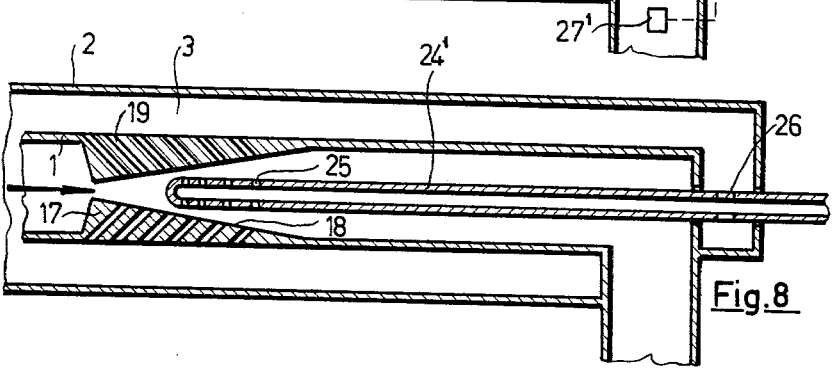

According to FIG. 8, the solid displacement rod 24 is replaced by a hollow displacement rod $24^1$ for accommodating the gelatinizing reagent, the said rod $24^1$ comprising outlet openings 25 facing the flowing suspension of substance. The openings 26 produce a connection between the jacket chamber 3 and the interior of the displacement rod $24^1$. The interior of the rod $24^1$ could however also be charged with gelatinizing reagent independently of the jacket chamber 3.

Each of the means illustrated in FIGS. 7 and 8 can also be employed jointly with the means illustrated in FIGS. 5 and 6. The arrangements which have been described enable the flow conditions in the interior thereof to be substantially adapted to the operating conditions prevailing at the time. The cover members 20, $21^1$ of FIGS. 5 and 6 particularly influence the supply of the gelatinizing reagent, whereas the displacement rods 24 and $24^1$ of FIGS. 7 and 8, respectively, permit the velocity of the suspension in the constricted portion of the cross-section to be altered. These means can be operated manually or also by an automatic regulating device. For example, a meter element 27 for the gelatinization temperature or for the throughflow quantity of suspension is provided in FIG. 5, the said element acting on the gearwheel 22 actuating the sleeve 20, so that with rising temperature, the sleeve 20 is adjusted in the direction for reducing the supply of steam through the orifices 19, and with an increase in the throughput quantity of suspension, it is adjusted in the direction for increasing the supply of steam or another reagent through the orifices 19. A regulating means with a corresponding meter element 27¹ according to FIG. 7, on the contrary, would have to act on the displacement rod 24 in the sense that, with a decrease in the throughput quantity of suspension, the free cross-sectional area is reduced by axial displacement towards the constriction in cross-section, thereby increasing the flow velocity of the said suspension, in order to guarantee a uniform mixing of suspension and gelatinizing reagent.

The fitting of displacement members obviates the otherwise necessary interchange of nozzles and effective tube path of the gelatinization arrangement with changing production capacity.

In order to exert an additional advantageous effect on the substance to be treated, those surfaces of the arrangement coming into contact with the suspension of substance and the paste, including a displacement rod if it is provided, can be formed with irregularities. These may for example comprise annular or helical recesses, such as screwthreads of suitable depth and pitch, or also of separate protuberances, such as pins or hooks. The boundary layer of the flowing substance is influenced by these measures and an additional mixing effect is produced.

The apparatus described may be constructed as component part of a paste-using machine or plant, for example a paper-making machine, a sizing plant or fermentation plant, thereby obviating long distances for the transport of the paste to the place of use.

Without departing from the principle of the invention, the different embodiments of the cross-section constriction and the transition region as illustrated by the parts 4 of FIGS. 1 and 2, 9–10 of FIG. 3, 12–13 of FIG. 4 and 17–18 of FIGS. 5 to 8 may be interchanged.

What is claimed is:

1. Apparatus for the continuous gelatinization of starch, partly decomposed starch and starch derivatives by means of a gelatinizing reagent comprising:
    (a) a tube through which a suspension of the material to be gelatinized is continuously passed;
    (b) a generally annular projection extending inward from the walls of the tube having an inner peripheral edge which defines a constricted passage of limited axial extent through which the suspension flows;
    (c) said tube having a plurality of circumferentially distributed orifices, for the supply of the gelatinizing reagent, situated downstream from the constricted passage but in a transition region in which the flow of the suspension diverges to the full cross-section of the tube.

2. The combination defined in claim 1 in which said projection is a diaphragm.

3. The combination defined in claim 1 in which said orifices have their axes arranged to converge toward the axis of the tube in the direction of flow.

4. The apparatus defined in claim 1 in which the cross-section constriction is formed as a nozzle.

5. The apparatus defined in claim 1 in which the cross-section constriction is followed by a gradual widening of the tube cross-section.

6. The apparatus defined in claim 1 comprising means serving to alter the relative quantities, pressures and velocities of the suspension of the substance to be gelatinized and of the gelatinizing reagent.

7. The apparatus defined in claim 6 comprising means for varying the free cross-sectional area of the orifices.

8. The apparatus defined in claim 7 in which a cover member is provided, the position of which relatively to the inlet orifice is adapted to be altered.

9. The apparatus defined in claim 8, in which the cover member is formed as a closed sleeve arranged coaxially with the tube so as to alter, by axial displacement, the number of free orifices for the gelatinizing reagent.

10. The apparatus defined in claim 8 comprising control means adapted to alter the position of the cover member as a function of at least one of the operating characteristics: gelatinization temperature and throughflow quantity of the gelatinized substance.

11. Apparatus for the continuous gelatinization of starch, partly decomposed starch and starch derivatives by means of a gelatinizing reagent comprising:
    (a) a tube through which a suspension of the material to be gelatinized is continuously passed;
    (b) a generally annular projection extending inward from the walls of the tube having an inner peripheral edge which defines a constricted passage of limited axial extent through which the suspension flows;
    (c) said tube having a plurality of circumferentially distributed orifices, for the supply of the gelatinizing reagent, situated downstream from the constricted passage but in a transition region in which the flow of the suspension diverges to the full cross-section of the tube; and
    (d) means serving to alter the relative quantities, pressures and velocities of the suspension of the substance to be gelatinized comprising a displacement rod arranged coaxially of the tube and serving to alter the cross-sectional area of the tube in the transition region following the cross-section constriction of the tube.

12. The apparatus defined in claim 11 in which the displacement rod is mounted to be displaceable axially.

13. The apparatus defined in claim 12 in which the displacement rod has a form which tapers toward the cross-section constriction of the tube.

14. The apparatus defined in claim 12 in which the displacement rod is hollow for accommodating gelatinizing reagent and comprises outlet openings toward the substance to be gelatinized.

15. The apparatus defined in claim 12 comprising automatic control means adapted to alter the position of the displacement rod as a function of at least one of the operating characteristics: gelatinization temperature and throughflow quantity of the gelatinized substance.

16. Apparatus for the continuous gelatinization of starch, partly decomposed starch and starch derivatives by means of a gelatinizing reagent comprising:
    (a) a tube through which a suspension of the material to be gelatinized is continuously passed;
    (b) a generally annular projection extending inward from the walls of the tube having an inner peripheral edge which defines a constricted passage of limited axial extent through which the suspension flows;
    (c) said tube having a plurality of circumferentially distributed orifices, for the supply of the gelatinizing reagent, situated downstream from the constricted passage but in a transition region in which the flow of the suspension diverges to the full cross-section of the tube; and
    (d) a screen arranged after said transition region so as to temporarily subdivide the substance being gelatinized into a number of partial streams.

17. Apparatus for the continuous gelatinization of starch, partly decomposed starch and starch derivatives by means of a gelatinizing reagent comprising:
    (a) a tube through which a suspension of the material to be gelatinized is continuously passed;
    (b) a generally annular projection extending inward from the walls of the tube having an inner peripheral edge which defines a constricted passage of limited axial extent through which the suspension flows;
(c) said tube having a plurality of circumferentially distributed orifices, for the supply of the gelatinizing reagent, situated downstream from the constricted passage but in a transition region in which the flow of the suspension diverges to the full cross-section of the tube;
(d) means to alter the relative quantities, pressures and velocities of the suspension of the substance to be gelatinized and of the gelatinizing reagent comprising a sleeve arranged coaxially of the tube, said sleeve having orifices corresponding to the inlet orifices for the gelatinizing reagent; and
(e) means to move said sleeve so as to vary the free cross-sectional area of the individual inlet orifices.

18. Apparatus for the continuous gelatinization of starch, partly decomposed starch and starch derivatives by means of a gelatinizing reagent comprising:
(a) a tube through which a suspension of the material to be gelatinized is continuously passed;
(b) a generally annular projection extending inward from the walls of the tube having an inner peripheral edge which defines a constricted passage of limited axial extent through which the suspension flows;
(c) said tube having a plurality of circumferentially distributed orifices, for the supply of the gelatinizing reagent, situated downstream from the constricted passage but in a transition region in which the flow of the suspension diverges to the full cross-section of the tube; and
(d) means to alter the relative quantities, pressures and velocities of the suspension of the substance to be gelatinized and of the gelatinizing reagent comprising means for altering the cross-sectional area of the tube in the transition region following the cross-section constriction of the tube.

19. Apparatus for the continuous gelatinization of starch, partly decomposed starch and starch derivatives by means of a gelatinizing reagent comprising:
(a) a tube through which a suspension of the material to be gelatinized is continuously passed;
(b) a generally annular projection extending inward from the walls of the tube having an inner peripheral edge which defines a constricted passage of limited axial extent through which the suspension flows;
(c) said tube having a plurality of circumferentially distributed orifices, for the supply of the gelatinizing reagent, situated downstream from the constricted passage but in a transition region in which the flow of the suspension diverges to the full cross-section of the tube; and
(d) a second annular projection like the first-named projection and arranged downstream from the first-named projection, said tube having a second plurality of supply orifices in the transition region of the second projection.

References Cited by the Examiner

UNITED STATES PATENTS

| | | | |
|---|---|---|---|
| 285,822 | 10/1883 | Korting | 261—76 |
| 1,873,070 | 8/1932 | Tifft | 23—284 X |
| 2,202,573 | 5/1940 | Coppock | 127—28 |
| 2,645,463 | 7/1953 | Stearns | 259—4 |
| 2,798,794 | 7/1957 | Muench et al. | 23—252 |
| 2,913,232 | 11/1959 | Silverman | 261—76 X |

FOREIGN PATENTS 855,775　12/1960　Great Britain.

OTHER REFERENCES

Ethridge: Paper Trade Journal, Nov. 5, 1954, pp. 16–18.

MORRIS O. WOLK, *Primary Examiner.*

JAMES H. TAYMAN, Jr., *Examiner.*